No. 676,368.  
J. PATRICK.  
RUBBER TIRE.  
(Application filed May 7, 1900.)  
(No Model.)
Patented June 11, 1901.
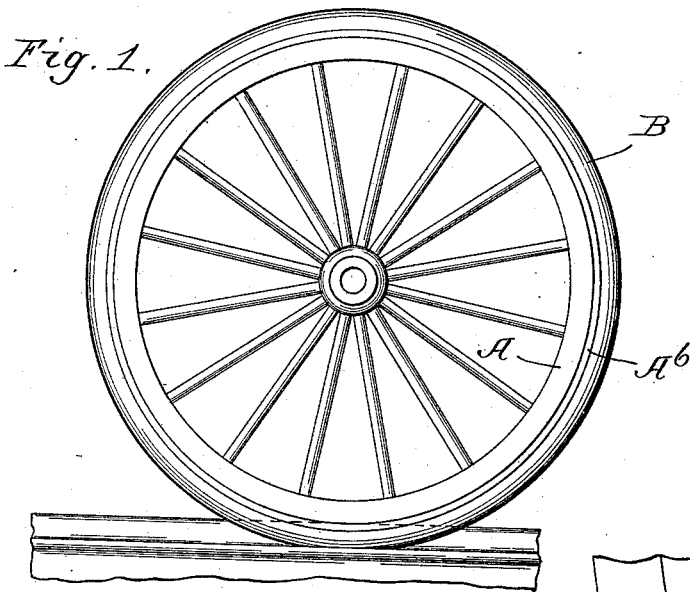
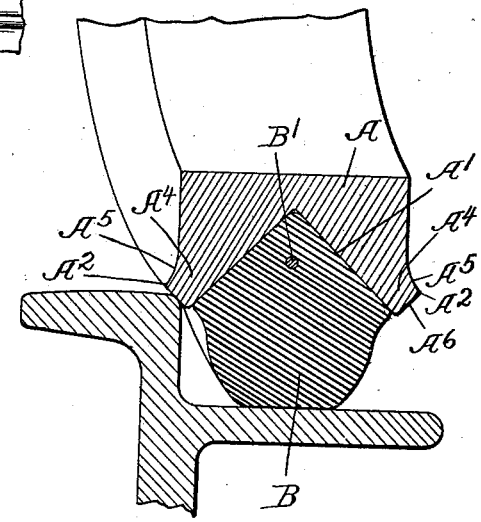
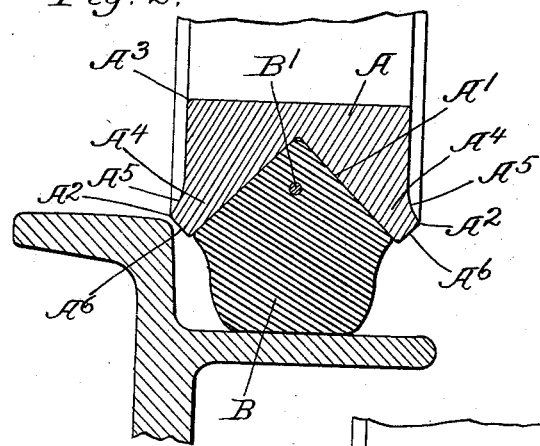
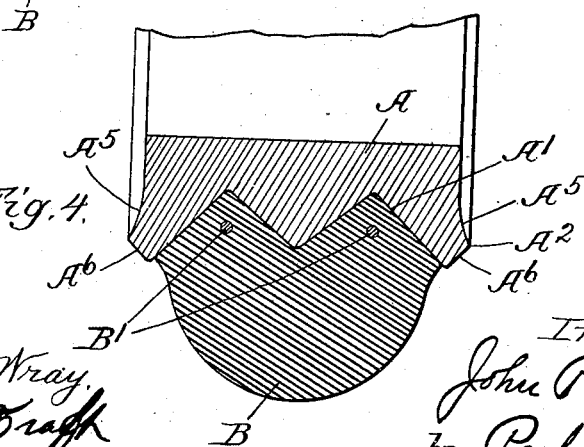
Witnesses.  
Edward T. Wray.  
Howard L. Krafft
Inventor.  
John Patrick  
by Parker & Carter  
his Atty's.
THE NORRIS PETERS CO., PHOTO-LITHO., WASHINGTON, D. C.

UNITED STATES PATENT OFFICE.

JOHN PATRICK, OF CHICAGO, ILLINOIS.

RUBBER TIRE.

SPECIFICATION forming part of Letters Patent No. 676,368, dated June 11, 1901.

Application filed May 7, 1900. Serial No. 15,711. (No model.)

*To all whom it may concern:*

Be it known that I, JOHN PATRICK, a citizen of the United States, residing at Chicago, in the county of Cook and State of Illinois, have invented a certain new and useful Improvement in Rubber Tires, of which the following is a specification.

My invention relates to rubber tires for vehicles and the like, and has for its object to provide a new and improved tire of this description.

My invention is illustrated in the accompanying drawings, wherein—

Figure 1 is a view of a wheel provided with a tire embodying my invention. Fig. 2 is a section through the tire and rim of the wheel, showing the wheel in position between the rails of a street-railway track. Fig. 3 is a view similar to Fig. 2, showing the position of the parts when the wheel is cramped or turned to turn out of the track. Fig. 4 shows a modified construction.

Like letters refer to like parts throughout the several figures.

It is customary in cities where street-railways are operated for all kinds of vehicles to run along the track with the wheels between the rails. When the vehicle is provided with the ordinary wheel or with one of the rubber-tired wheels now in use, it is difficult to turn out from said track, as the edge of the wheel slides along the track for a considerable distance before the turn can be made. When the ordinary rubber-tired wheel is used, this sliding wears the confining part of the tire and turns the sharp edge in, so as to mutilate the rubber and irreparably injure it. This sliding on the rails also produces other injurious results, which very materially shorten the life of the rubber tire.

One of the objects of my invention is to provide a tire so constructed that these difficulties and evils will be obviated. I have shown one form of construction for this purpose. In this construction the channel A is made of iron or other suitable material and acts as a confining device for the rubber tire B. This channel is preferably provided with a V-shaped groove A′, into which the rubber fits, the tire being also held in position by the binding device or wire B′. Extending around the channel on each side is a projecting edge $A^2$, which projects beyond the inner side $A^3$ of the flange. The contour of the face of the channel between $A^2$ and $A^3$ may be arranged as will best permit the construction of the channel. I prefer to construct the parts with this face substantially straight up to the point $A^5$, where it is curved out, as shown. Between the edges $A^2$ and the tire-groove A′ are the thickened portions $A^4$, each provided with a face $A^6$, preferably inclined or beveled. These faces form an engaging surface for the rail when the wheel is cramped and permit the wheel to readily ride upon the rail, so as to pass over it, thus obviating the sliding therealong and insuring the immediate and complete removal of the vehicle from between the rails. These thickened portions also protect the rubber and prevent undue injury thereto under conditions where the edge of the flange comes into contact with any obstacle, such as rails, curbstones, or the like.

In Fig. 2 I have shown the tire of the wheel in the position it would be in when running along between the rails of the track.

In Fig. 3 I have shown the position of the parts when the wheel is cramped to turn out of the track. In this case the face $A^6$ of the thickened portion $A^4$ engages and rides up onto the rail as soon as the wheel is cramped, and the rubber is not injured in any way.

I have shown a modified construction in Fig. 4, wherein the channel is provided with two grooves A′, there being two binding devices B′, as shown. This construction insures the holding of the tire in the channel and is of value under all conditions, but particularly when large heavy tires are used.

I have described a particular construction embodying my invention; but it is of course evident that the parts may be varied in some particulars and that the shape may be changed without departing from the spirit of my invention. I therefore do not limit myself to the construction shown.

I claim—

A wheel, comprising a metal channel extending therearound and provided with two V-shaped grooves placed side by side, a rubber piece surrounding the wheel and provided with V-shaped projections which extend into said grooves, two confining devices separate from the channel and passing through the substance of the rubber, so as to hold it in position, and a thickened projection at each side of the channel provided with an inclined face, substantially as described.

JOHN PATRICK.

Witnesses:
 DONALD M. CARTER,
 HOMER L. KRAFT.